United States Patent [19]

Grise

[11] Patent Number: 4,581,521

[45] Date of Patent: Apr. 8, 1986

[54] ELECTRICALLY HEATED PIPE ASSEMBLY

[76] Inventor: Frederick G. J. Grise, P.O. Box 186, Osterville, Mass. 02655

[21] Appl. No.: 674,694

[22] Filed: Nov. 26, 1984

Related U.S. Application Data

[60] Continuation-in-part of Ser. No. 674,698, Nov. 26, 1984, which is a division of Ser. No. 295,000, Aug. 21, 1981, Pat. No. 4,485,297, which is a continuation-in-part of Ser. No. 181,974, Aug. 28, 1980, abandoned.

[51] Int. Cl.$^4$ ............................................. H05B 3/58
[52] U.S. Cl. ................................ 219/535; 219/528; 219/543; 219/541; 219/549; 338/212
[58] Field of Search .............. 219/203, 345, 505, 522, 219/528, 535, 541, 543, 544, 549, 553; 174/68.5; 338/212, 295, 300, 302, 320, 309, 328

[56] References Cited

U.S. PATENT DOCUMENTS

| | | | |
|---|---|---|---|
| 2,179,819 | 11/1939 | Hoving | 219/535 X |
| 2,274,839 | 3/1942 | Marick | 219/528 X |
| 2,683,673 | 7/1954 | Silversher | 219/549 X |
| 2,719,907 | 10/1955 | Combs | 219/528 |
| 3,105,136 | 9/1963 | Ashenfarb | 219/543 X |
| 3,126,469 | 3/1964 | Feldmann et al. | 219/543 X |
| 3,717,746 | 2/1973 | Breitweiser | 219/535 X |
| 3,781,526 | 12/1973 | Dawron | 219/528 X |
| 3,898,427 | 8/1975 | Levin et al. | 219/522 |
| 4,484,061 | 11/1984 | Zelinka | 219/535 X |
| 4,485,297 | 11/1984 | Grise et al. | 219/528 |

Primary Examiner—Volodymyr Y. Mayewsky

[57] ABSTRACT

A heated pipe assembly, particularly useful with plastic pipe, which comprises a pipe having an electrically insulating, longitudinally-extending outer surface, a pair of conductors extending longitudinally of the outer surface generally parallel to and spaced from each other, an organic plastic sheet wrapped circumferentially around the outer surface of the pipe, and a semiconductor pattern carried on a radially-facing surface of the sheet. The semi-conductor pattern comprises a plurality of generally axially-spaced semi-conductor strips and, between adjacent strips, a portion of the plastic sheet that is free from the semi-conductor pattern. The stripes are on the same side of the sheet as the conductors, and each stripe is in electrical contact with both conductors.

13 Claims, 7 Drawing Figures

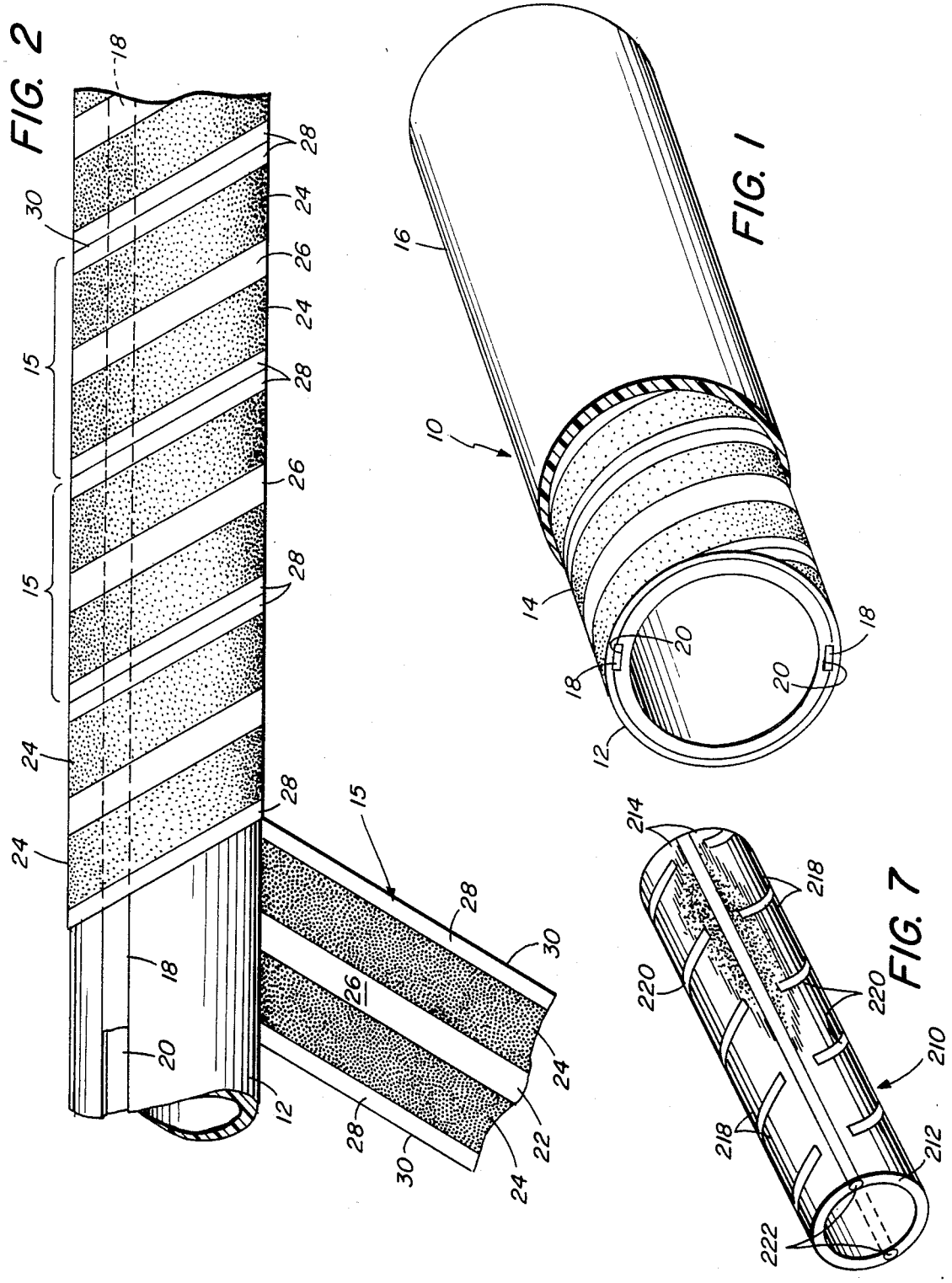

ELECTRICALLY HEATED PIPE ASSEMBLY

CROSS-REFERENCE TO RELATED APPLICATIONS

This invention is a continuation-in-part of U.S. application Ser. No. 674,698 filed Nov. 26, 1984, which is a division of U.S. application Ser. No. 295,000 filed Aug. 21, 1981, now U.S. Pat. No. 4,485,297 issued Nov. 27, 1984 which is a continuation-in-part of U.S. application Ser. No. 181,974 filed Aug. 28, 1980, now abandoned, all of which are here incorporated by reference.

FIELD OF INVENTION

This invention relates to pipe and, more particularly, to electrically heated pipe.

BACKGROUND OF THE INVENTION

There are a number of applications in which heated pipe is desirable or necessary. For example, it may be necessary to heat domestic, boat or recreational vehicle water pipes to prevent freezing. Similarly, many manufacturing procedures require that materials being processed be maintained at a specific temperature while they flow through pipe from one location to another or otherwise.

In the past, it has been difficult and expensive to provide satisfactory heating, especially with non-metallic pipes.

SUMMARY OF THE INVENTION

The present invention features a heated pipe assembly, particularly useful with plastic pipe, which comprises a pipe having a longitudinally-extending outer surface, a pair of conductors extending longitudinally of the outer surface generally parallel to and spaced from each other, an organic plastic sheet wrapped circumferentially around the outer surface of the pipe, and a semi-conductor pattern carried on a radially-facing surface of the sheet. The semi-conductor pattern comprises a plurality of generally axially-spaced semi-conductor stripes and, between adjacent strips, a portion of the plastic sheet that is free from the semi-conductor pattern. The stripes are on the same side of the sheet as the conductors, and each stripe is in electrical contact with both conductors.

In preferred embodiments in which the plastic sheet comprises a tape wrapped helically around the pipe, the semi-conductor pattern is on the radially-inner side of the organic plastic sheet, and an insulating layer is co-extruded over the tape. In embodiments in which the pipe is flexible, the conductors comprise wire formed in a serpentine pattern.

DRAWINGS

FIG. 1 is a perspective view, partially in section, of a heated pipe assembly embodying the present invention.

FIG. 2 is a plan, partially diagramatic, view of the pipe assembly of FIG. 1, with the outer insulation layer removed and the heating layer partially broken away.

FIG. 7 is a perspective view of a modified pipe assembly embodying the present invention.

DESCRIPTION OF PREFERRED EMBODIMENTS

Figure 3:
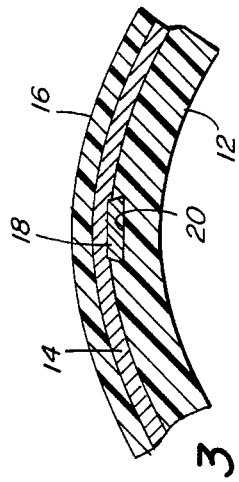
FIG. 3 is a sectional view of a portion of the pipe assembly of FIG. 1.

Referring now to FIGS. 1 through 3 there is shown a heated pipe assembly, generally designated 10, comprising a cylindrical plastic (CPVC) pipe 12, a heating layer 14 including an elongated electrical heating tape 15 helically wrapped tightly around the exterior cylindrical surface of pipe 12, and a cylindrical, organic plastic, insulating sleeve 16 shrink fitted (e.g., a PVC tape helically wrapped around tape 14 and then heat-treated to shrink it tightly into place, or a PVC tube slipped over the tape layer and then similarly heat-shrinked) around or, preferably, co-extruded over, the exterior of heating layer 14. A pair of flat copper strip electrodes 18 (about ½ inch wide and 0.003 inch thick) are mounted in shallow recesses 20 in the exterior cylindrical surface of pipe 12. As shown, electrodes 18 are diametrically spaced from each other and extend, parallel to each other and to the axis of pipe 10, along the length of the pipe. The relative thickness of the electrodes 18 and depth (measured radially) of recesses 20 are such that the electrodes 18 extend radially beyond the pipe outer surface and are in tight face-to-face engagement with heating layer 14.

The tape 15 of heating layer 14 is a one inch wide, 0.004 inch thick strip 22 of essentially transparent polyester ("Mylar") on one side of which has been printed a semi-conductor pattern (of the type disclosed in the cross-referenced prior applications) comprising two parallel semi-conductor stripes 24 (each ⅝ inch wide) separated by a central area 26 (⅜ inch wide) which is free from semi-conductor material. The semi-conductor pattern is much thinner than tape 15 and, accordingly, is not shown in the cross-sectional view of FIG. 3. Similar semi-conductor-free areas 28 each 3/16 inch wide) are provided along the two side edges of the tape 14. As shown most clearly in FIG. 2, the tape 15 is wrapped helically around the exterior of pipe 12 with the side edges 30 of adjacent turns abutting each other. In the preferred embodiments, the tape is wrapped with the semi-conductor pattern facing radially inwardly, i.e., so that the semi-conductor stripes 24 engage the copper conductors 18. Because the plastic strip 22 is essentially transparent, the semi-conductor stripes 24 and semi-conductor areas 26, 28 are clearly visible in the drawings even through they are on the inside of the heating layer 14.

Figure 4:
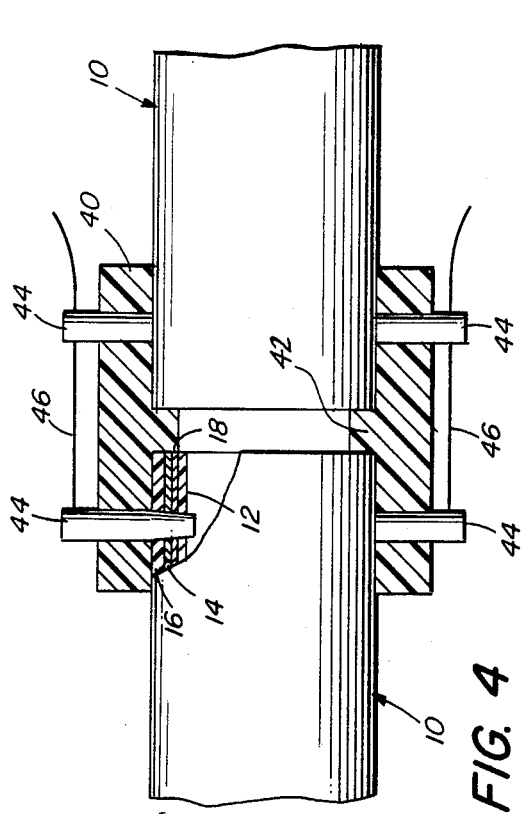
FIG. 4 is a sectional view of a system for connecting pipe assemblies of the present invention.

The system for connecting adjacent lengths of pipe and making the necessary electrical connections is shown in FIG. 4. The ends of two pipes 10 are inserted into opposite ends of a sleeve 40, with the copper electrodes 18 of one pipe in axial alignment with the copper electrodes of the other, until the pipe ends abut a circumferential flange 42 at the middle of the sleeve. Four electrical connecting pins 44 are screwed radially into the sleeve. Each pin passes through (and thus provides electrical contact with) one of the electrodes 18 of each pipe 10. The two pins 44 on each side of the sleeve 40 are connected to each other with a wire conductor 46. At the ends of the overall pipe, or at regular intervals if the overall pipe is of considerable length, the wires 46 are in turn connected to an electrical power source (not shown).

The construction of FIGS. 1-3 is particularly suited for rigid or relatively straight pipe; the flat copper strip electrodes 18 permit relatively little bending. For flexible pipe, such as is used in recreational vehicles, it is preferred to use an electrode 118 such as that shown in FIGS. 5 and 6. Electrode 118 is soft, tin plated, 20 gauge (about 0.032 inch diameter) bus wire bent into a serpentine shape (as shown most clearly in FIG. 6) so that the overall width of the electrode 118 is about ½ inch. The recess 120 into which the electrode fits is about 0.025 inch deep (i.e., as with the FIGS. 1-3 embodiment is slightly less deep than the overall thickness of the electrode), and is made a little less than ½ inch wide with its side edges inclined slightly inwardly towards each other. Thus, as shown, the serpentine wire electrode 118 will snap into, and be retained in place in, the recess 120. The serpentine shape of the electrode 118 permits the electrode to increase or decrease in length, as required when the pipe is bent, without danger of breaking.

Figure 5:
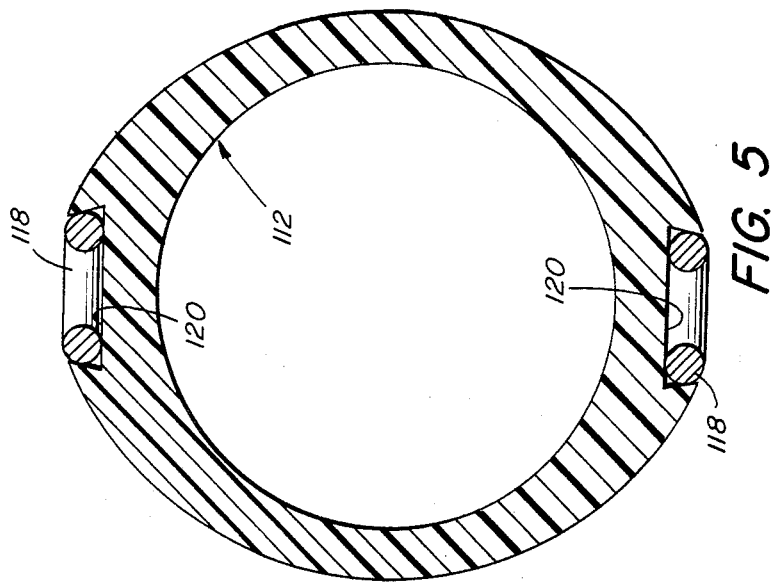
FIG. 5 is a sectional view of a modified pipe used in the pipe assembly of the present invention.

FIG. 5 also shows, in cross section, a flexible polybutylene pipe 112 which can be substituted for rigid CPVC pipe 12 in pipe assembly 10. As shown the outer surface 114 of pipe 112 is slightly elliptical, thus providing substantially the same wall thickness both in the portions of the pipe defining recesses 120 and in the rest of the pipe side wall.

Figure 6:
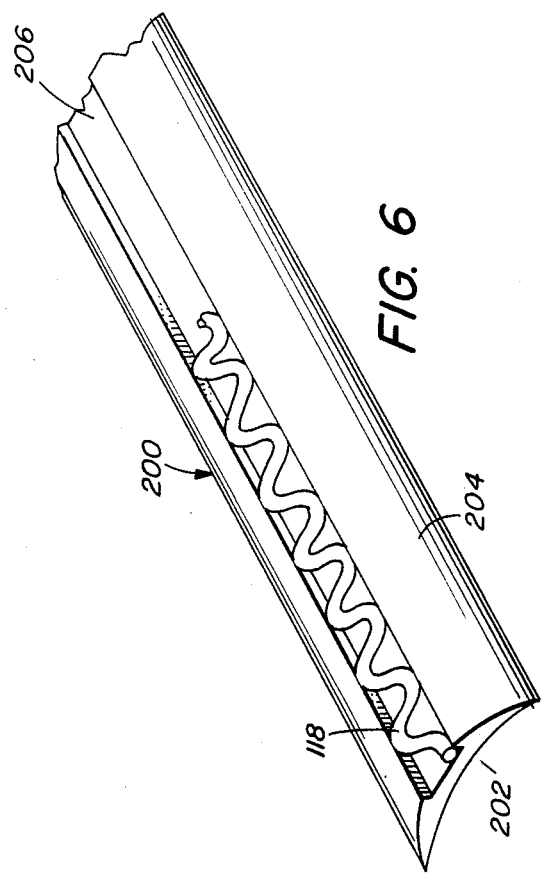
FIG. 6 is a perspective view, partially in section, of a conductor retainer for use in pipe assemblies of the present invention.

FIG. 6 shows an electrode retainer 200 that facilitates the use of the present invention with, for example, conventional cylindrical flexible pipe. Retainer 200 has a cylindrical inner surface 202 adapted to fit tightly around the exterior surface of a conventional cylindrical pipe, and an elliptical outer surface 204 that provides, in the center of the retainer, sufficient thickness to permit a recess 206 for a serpentine conductor 118. As will be evident, a pair of retainers 200 with conductors 118 therein may be placed on opposite sides of a conventional cylindrical pipe, and the electrical heating tape 15 then wrapped around the entire assembly as in the FIGS. 1-3 embodiments.

In the above embodiment, the conductive graphite of semi-conductor pattern covers about ⅔ of the total surface area of the pipe and is designed to provide about 35 watts per linear foot. In other embodiments, the graphite coverage may be more or less, depending on the particular application, but usually should not be less than about 50 percent.

OTHER EMBODIMENTS

Although the present invention is particularly suited to use with plastic pipe, it may be used with steel pipe also. When so used, either the outer surface of the steel pipe must be coated with an electrically insulating layer before the electric heating tape 15 is wrapped therearound, or the tape must be wrapped with the semi-conductor pattern facing outwardly (so that the substrate 22 will provide an insulating layer beween the semi-conductor pattern and the steel pipe) and with the copper conductors 18 between the tape 15 and the outer layer of insulation 16.

FIG. 7 illustrates a pipe assembly, generally designated 210, including a plastic pipe 212 in which are embedded a pair of elongated parallel electrodes 222 at 180° with respect to each other. The semi-conductor pattern, which may be printed either directly on the pipe 212 (as shown) or on a polyester sheet which is then wrapped around the pipe 212, comprises four axially-extending semi-conductor bars 214 and a plurality of semi-conductor stripes 218 spaced from each other and extending generally helically around the pipe. Semi-conductor free areas 220 are provided between adjacent stripes 218. As shown, two bars 214 are provided in electrical contact with each of conductors 222, and each stripe 218 extends (slightly less than 180°) from a bar 214 on one side of one of conductors 222 to the bar 214 on the same side of the other conductor 222.

Other embodiments will be within the scope of the following claims.

What is claimed is:

1. An electrically heated pipe assembly comprising:
   a pipe having a longitudinally-extending, electrically-insulating outer surface;
   a pair of conductors extending longitudinally of said pipe outer surface, said conductors being generally parallel to and spaced apart from each other;
   an organic plastic sheet wrapped circumferentially around said pipe outer surface; and,
   a semi-conductor pattern carried on a radially-facing surface of said plastic sheet, said pattern being arranged to provide a plurality of axially spaced conductive stripes and, between adjacent ones of said stripes, a portion of said sheet that is free from said semi-conductor pattern,
   said stripes and said conductors being on the same radial side of said sheet and each of said stripes engaging both of said conductors.

2. The pipe assembly of claim 1 wherein said plastic sheet comprises a tape wrapped helically around said pipe outer surface.

3. The pipe assembly of claim 2 wherein said tape includes a plurality of semi-conductor stripes extending longitudinally of said tape parallel to and spaced apart from each other, a semi-conductor free area intermediate adjacent ones of said stripes, and a semi-conductor free area extending along each of the longitudinal side edges of said tape.

4. The pipe assembly of claim 1 wherein said stripes are on the radially-inward side of said sheet.

5. The pipe assembly of claim 4 wherein the exterior surface of said pipe defines a pair of longitudinally-extending recesses, one of said conductors being mounted in each of said recesses and the radial depth of each of said recesses being not greater than the thickness of a respective one of said conductors.

6. The pipe assembly of claim 1 wherein said conductor comprises a wire formed in a serpentine pattern to form a generally planar conductor having width several times its thickness.

7. The pipe assembly of claim 6 wherein said pipe is flexible.

8. The pipe assembly of claim 1 including a generally cylindrical insulating layer defining the outer surface of said pipe assembly.

9. An electrically heated pipe assembly comprising:
   a pipe having a longitudinally-extending, electrically insulating outer surface;
   a pair of conductors extending longitudinally of said pipe, said conductors being generally parallel to and spaced apart from each other; and,
   a semi-conductor pattern engaging said outer-surface and said conductors, said pattern being arranged to provide a plurality of axially-spaced conductive stripes and, between adjacent ones of said stripes, an area that is free from said semi-conductor pattern, said stripes and said conductors being on the same radial side of said sheet and each of said stripes engaging both of said conductors.

10. The pipe assembly of claim 9 wherein said semi-conductor pattern is carried on an organic plastic sheet wrapped circumferentially around said pipe outer surface.

11. An electrically heated pipe assembly comprising:

a pipe having a longitudinally-extending, electrically-insulating outer surface;

a pair of parallel conductors mounted on said outer surface on generally diametric opposite sides of said pipe;

an organic plastic tape wrapped helically around said pipe outer surface; and, a semi-conductor pattern carried on a radially-inwardly facing surface of said tape, said pattern comprising a pair of parallel conductive stripes extending longitudinally of said tape and spaced apart from each other, a semi-conductor free area intermediate said stripes and a semi-conductor free area extending along each of the longitudinal side edges of said tape, whereby said stripes extend generally helically of said pipe and engage both of said conductors.

12. The pipe assembly of claim 11 including a generally cylindrical insulating layer surrounding said tape.

13. The pipe assembly of claim 12 wherein said insulating layer is heat-shrunk around said tape.

* * * * *